United States Patent
Chao et al.

(10) Patent No.: US 7,103,435 B2
(45) Date of Patent: Sep. 5, 2006

(54) SYSTEM AND METHOD OF CONTROL FACTOR MANAGEMENT

(75) Inventors: Jen-Lin Chao, Hsinchu (TW); Chin-Yung Chang, Hsinchu (TW); Wei-Kuo Yen, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 65 days.

(21) Appl. No.: 10/677,569

(22) Filed: Oct. 2, 2003

(65) Prior Publication Data

US 2005/0075747 A1    Apr. 7, 2005

(51) Int. Cl.
G05B 19/418    (2006.01)
G06F 19/00    (2006.01)

(52) U.S. Cl. .................. 700/100; 700/97; 700/104; 705/8

(58) Field of Classification Search .................. 700/96, 700/97, 99–104, 108, 111, 121; 705/8
See application file for complete search history.

(56) References Cited

U.S. PATENT DOCUMENTS 5,093,794 A * 3/1992 Howie et al. ............... 700/100
5,233,533 A * 8/1993 Edstrom et al. ............ 700/103
5,523,952 A * 6/1996 Inada .......................... 700/100
5,546,326 A * 8/1996 Tai et al. ..................... 702/84
6,128,588 A * 10/2000 Chacon ......................... 703/6
6,434,443 B1 * 8/2002 Lin ............................ 700/100
6,463,346 B1 * 10/2002 Flockhart et al. .......... 700/102
6,889,178 B1 * 5/2005 Chacon ......................... 703/6

* cited by examiner

Primary Examiner—Jayprakash N. Gandhi
(74) Attorney, Agent, or Firm—Thomas, Kayden, Horstemeyer & Risley

(57) ABSTRACT

A system and method for control factor management for a work-in-process (WIP) in a production system. A plan engine is programmed to receive an order for a product, reserve a capacity for the order based on a capacity model that considers a plurality of capacity vectors, and generate a plan for the WIP of the order according to a control factor. A control factor management module adjusts the control factor of the plan engine according to a current value of the control factor in the production system, a target value of the control factor, and a priority of the WIP. Preferably, a control factor matrix of the product is provided in the control factor management module as a function of the current value of the control factor in the production system, the target value of the control factor, the priority of the WIP, and a target date of the order.

37 Claims, 7 Drawing Sheets

SYSTEM AND METHOD OF CONTROL FACTOR MANAGEMENT

BACKGROUND OF THE INVENTION

1. Field of the Invention

The present invention relates to output planning management, and particularly to a computer implemented system and method of control factor management in a production system.

2. Description of the Related Art

In recent years, many enterprises or manufacturers have introduced the concept of "supply chain" to integrate their internal and external resources. The supply chain considers functions of purchase of materials, transformation of these materials into intermediate and finished products, and the distribution of these finished products to customers. Supply chains exist in most manufacturing environments, although the complexity of the chain may vary greatly from industry to industry and firm to firm. For integrated circuit (IC) foundries, the manufacturing process of each IC product is complicated and varies and the cost of wafers and capacity is relatively high.

In the supply chain, customers transmit requests (demands) consisting of a request for a particular quantity of a product by a specific date to a manufacturer, and the manufacturer plans its manufacturing schedule according to these received requests to satisfy each customer. After the order is taken, it is important for manufacturing systems to deliver products for clients on time. Therefore, the delivery date becomes crucial to assure clients when they can receive the product they ordered.

Many commercial supply chain solution providers provide packaged systems for clients to install and follow, such as i2 Inc. of Springfield Va. or ADEXA Inc. of Los Angeles Calif. (ADEXA is a registered trademark of ADEXA Inc.) For a manufacturer or a factory, a production scheduling engine is usually embedded in the systems to arrange resources and materials for a production plan. The production scheduling engines provide a master production schedule (MPS) as the production target for the manufacturer or factory to follow.

For conventional supply chain, delivery dates for products are designed to be estimated according to a customized algorithm that introduces critical factors of the manufacturing system. More specifically, the critical factors, i.e. the "control factors," of the customized algorithm are usually bottleneck factors for the manufacturing system. A forecasted result, i.e. a forecasted delivery date, can be obtained by the algorithm with the control factors determined. Accordingly, the control factors serve as a key input parameter of the production scheduling engines.

However, for the purpose of management in a manufacturing system, it is a dilemma to meet both the future production target and the forecasted results of current actual production. In a production system, e.g. an IC foundry, a cycle time for the IC product is generally applied as the control factor of the production scheduling engine, i.e. a plan engine 130 as shown in FIG. 1. The plan engine 130 generates a production schedule, i.e. a plan, for a work-in-process (WIP) 110 in the production system 150 based on the WIP 110 and the reserved capacity 120 for the WIP 110. The cycle time (the control factor) is determined by the planner and input to the plan engine 130 via a user interface 140.

When the cycle time is set to approach the current actual cycle time, accuracy of the forecasted delivery date increases, but the delivery date target requested by the client may be delayed. On the other hand, when the cycle time is set to meet the delivery date target, production can be improved to achieve the request of the client, but the quality and accuracy of the forecasted delivery date is unavoidably impacted. Generally, the planner determines the control factor to a fixed value by experience as a compromise between the future production target and the forecasted results of current actual production. There is no effective method for the planner to determine the control factor.

SUMMARY OF THE INVENTION

Accordingly, an object of the invention is to provide a system and method of control factor management to obtain a dynamic control factor for a plan engine used in output planning management for a production system. With the present invention, the planner can determine the control factor with respect to both the current actual control factor and the delivery date target of the product. Thus, both forecast quality of the plan engine and production improvement can be achieved for a work-in-process in the production system.

To achieve foregoing and other objects, the invention is directed to computer implemented systems and methods of control factor management in a production system. In one embodiment of the present invention, a computer implemented system for control factor management for a work-in-process (WIP) in the production system is provided. A plan engine is programmed to generate a plan for an order for the WIP according to a control factor, and a control factor management module adjusts the control factor of the plan engine according to a current value of the control factor in the production system, a target value of the control factor, and a priority of the WIP.

In another embodiment, a computer-implemented system for output planning with control factor management in a production system is provided. A plan engine is programmed to receive an order for a product, reserve a capacity for the order based on a capacity model that considers a plurality of capacity vectors in the production system, and generate a plan for the WIP of the order according to a control factor. A control factor management module adjusts the control factor of the plan engine according to a current value of the control factor in the production system, a target value of the control factor, and a priority of the WIP.

Preferably, the control factor management module has a database to store a plurality of historical control factors for the WIP, and a production monitor module to detect the current value of the control factor in the production system. In addition, the control factor management module outputs an alarm signal when the current value of the control factor deviates from the adjusted control factor.

In still another embodiment, a method for output planning with control factor management in an IC foundry is provided. A capacity model considering a plurality of capacity vectors in the IC foundry is provided. When receiving an order for an IC product, a control factor is provided for the IC product. A target value of the control factor for a work-in-process (WIP) of the IC product is provided, and a current value of the control factor for the WIP in the IC foundry is detected. Then, the control factor is adjusted according to the current value of the control factor, the target value of the control factor, and a priority of the WIP. Thus, a plan for the WIP of the order is generated based on the capacity model according to the adjusted control factor.

One feature of an embodiment of the present invention is a control factor matrix for the WIP of the product. Preferably, a plurality of control factor matrices is provided, which include the control factor matrix for the product. The control factor matrix of the product serves as a function of the current value of the control factor in the production system, the target value of the control factor, the priority of the WIP, and a target date of the order.

The present invention can be utilized in any production system, e.g. an IC foundry, in which the WIP can be wafers for processing and the control factor can be a cycle time for the WIP.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Disclosed herein are embodiments for a system and method of control factor management in a production system. To facilitate description of the invention, an example of a computer implemented system that can be used to implement control factor management is discussed with reference to the figures. Although this system is described in detail, it will be appreciated that this system is provided for purposes of illustration only and that various modifications are feasible without departing from the inventive concept. After the example system has been described, an example of operation of the system will be provided to explain the manner in which the system can be used to obtain a dynamic control factor to achieve both forecast quality of the plan engine and the production improvement. The preferred embodiments are further exemplified with IC foundry manufacturing, i.e. wafer fabrication. However, the present invention is not limited to the described embodiments.

Figure 1:
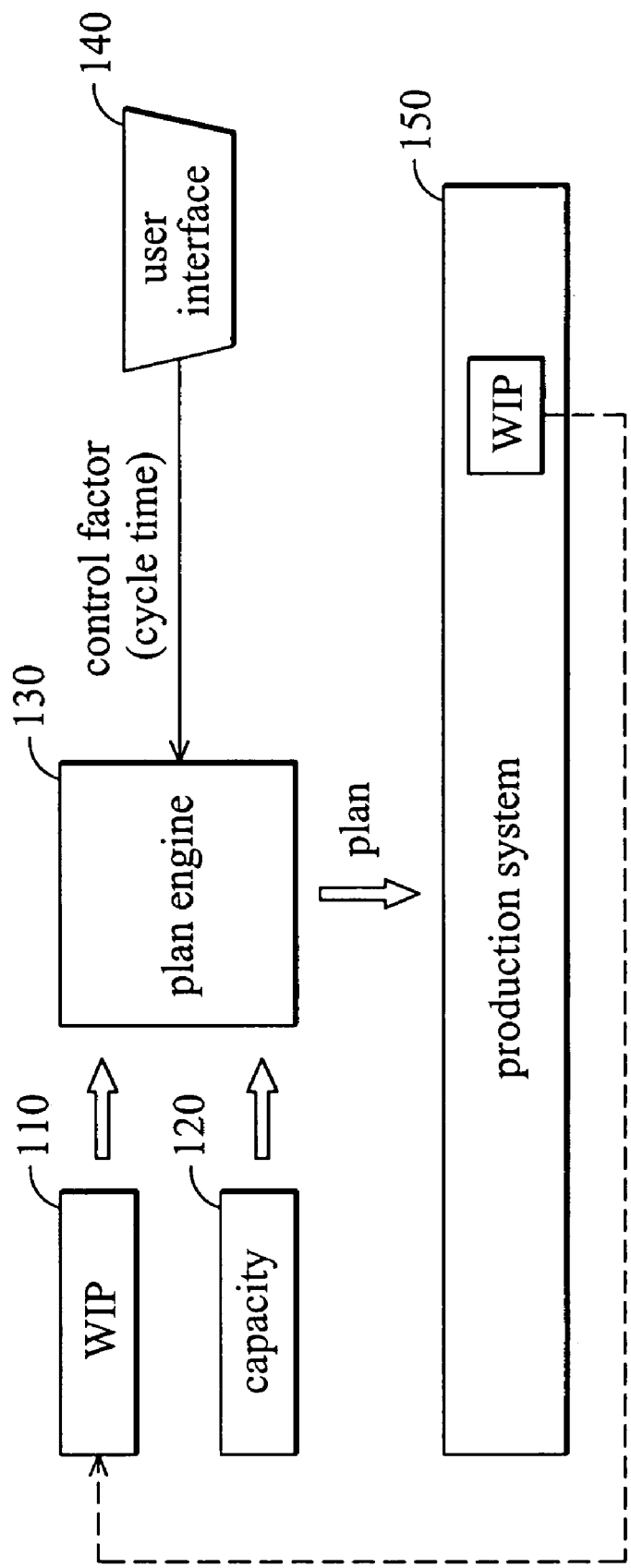
FIG. 1 is a schematic system structure showing conventional control factor determination.
Figure 2:
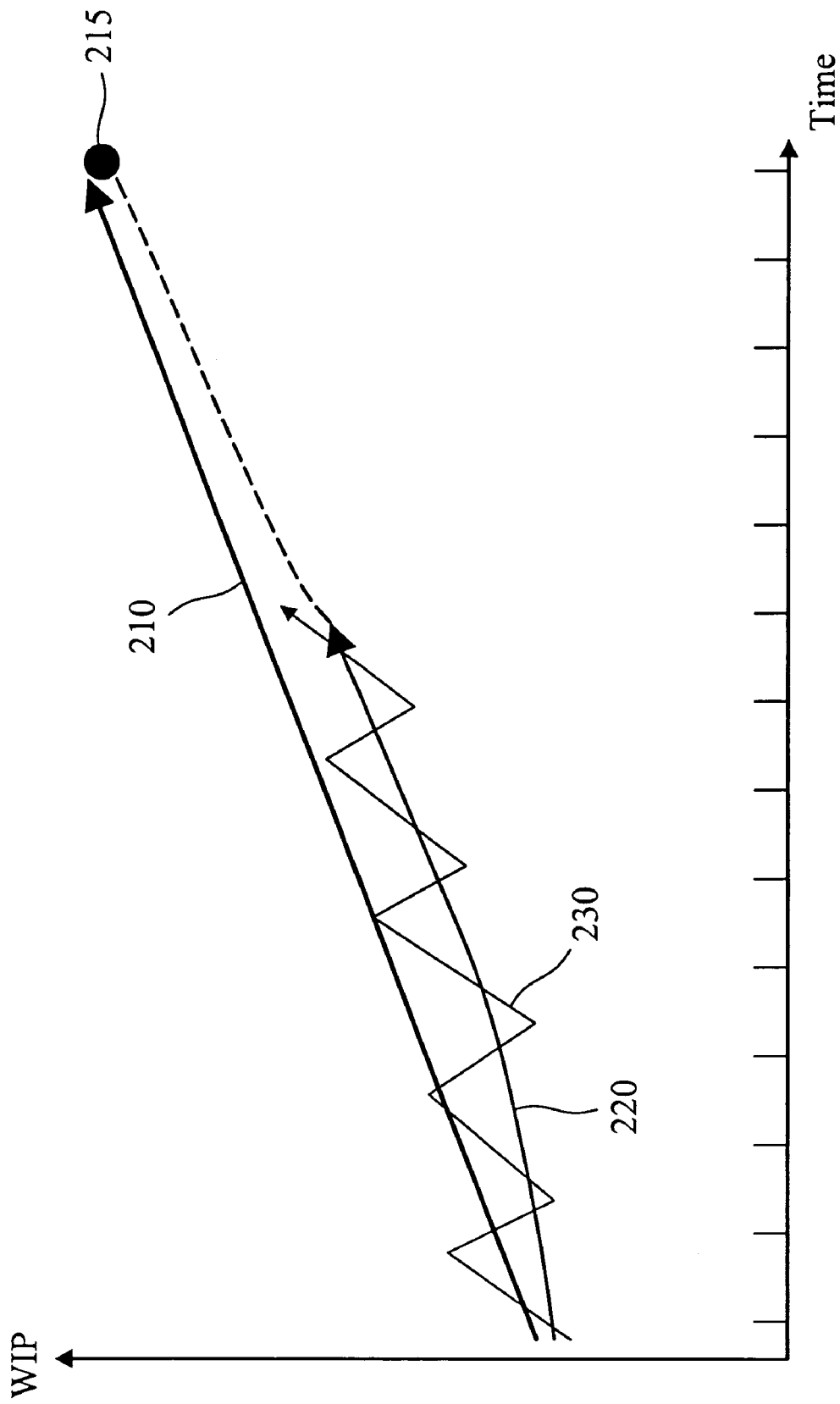
FIG. 2 is a diagram showing an embodiment of a model of the WIP, in which the control factor is the cycle time of the product.

As aforementioned, it is a dilemma to meet both the future production target and the forecasted results of current actual production for the purpose of management in a manufacturing system. For example, in a production system where a cycle time for the IC product is applied as the control factor of the production scheduling engine, a model of the WIP production can be shown as a diagram in FIG. 2. In FIG. 2, a target 215 of the IC product is set, and a straight line 210 of production with a fixed ideal cycle time (that is, the ideal control factor) can be obtained. However, the actual cycle time in the production system varies, which is illustrated by a polyline 230 of production in FIG. 2. A curve 220 can be further obtained by fitting of the polyline 230 to indicate a current cycle time of the production system. It is obvious that the current cycle time is longer than the ideal cycle time. For example, an IC foundry may have an ideal cycle time of 2.4 days per stage, but the current cycle time can be 2.7 days per stage. It is the object of the present invention to determine the cycle time with respect to both the current cycle time and the ideal cycle time, which is obtained from the target 215.

Figure 3A:
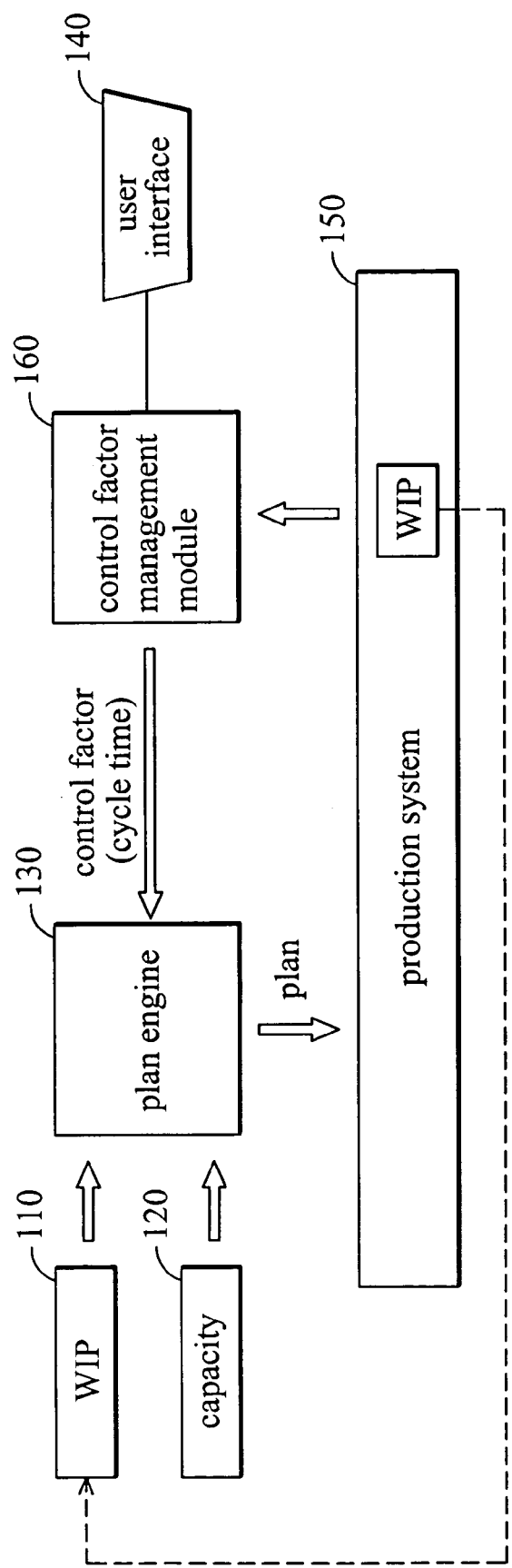
FIG. 3A is a schematic system structure showing the control factor management of the present invention.

FIG. 3A shows an embodiment of the computer implemented system of control factor management for a work-in-process (WIP) in the production system of the present invention. In FIG. 3A, a plan engine 130 is programmed to generate a production schedule, i.e. a plan, for an order for the WIP 110 in the production system 150 based on the WIP 110 and the reserved capacity 120 according to a control factor, i.e. the cycle time. A control factor management module 160 is applied to adjust the control factor (the cycle time) of the plan engine 130 according to a current value of the control factor (the current cycle time) in the production system 150, a target value of the control factor (the target cycle time, i.e. the ideal cycle time), and a priority of the WIP. A user interface 140 is provided in the control factor management module 160 for the planner to change the parameter settings of the plan engine 130 or to input the priority of the WIP.

Figure 3B:
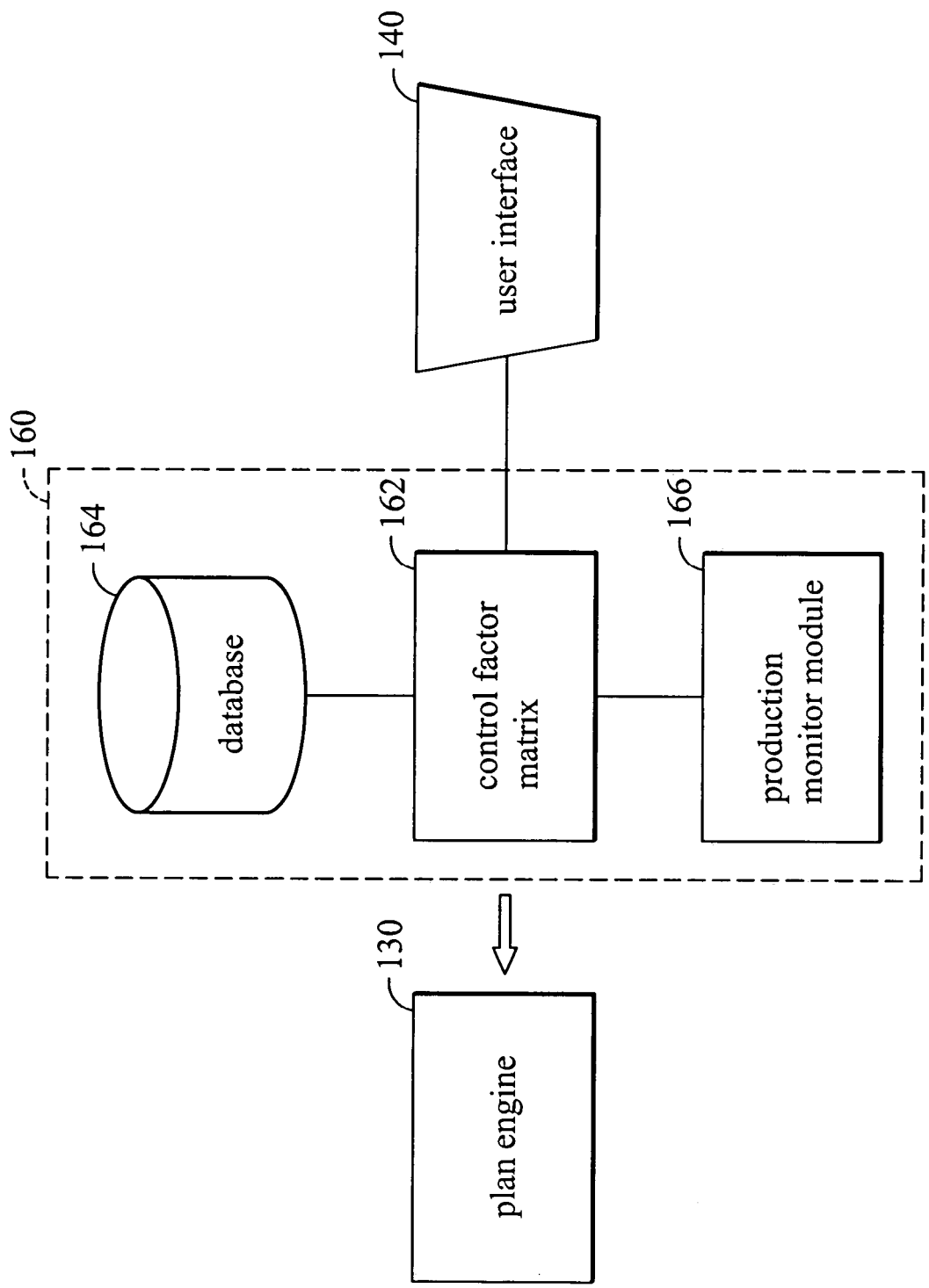
FIG. 3B is a schematic view showing an embodiment of the control factor management module in FIG. 3A.

Specifically, the schematic structure of an embodiment of the control factor management module 160 is shown in FIG. 3B. The control factor management module 160 has a control factor matrix 162, a database 164, and a production monitor module 166. The database 164 can be utilized to store a plurality of historical control factors for the WIP. The production monitor module 166 can be utilized to detect the current value of the control factor, i.e. the current cycle time, in the production system 150.

One feature of the control factor management module 160 is the control factor matrix 162 for the WIP of the product. Preferably, a plurality of control factor matrices, which includes the control factor matrix 162 for the product, is provided in the control factor management module 160.

The control factor matrix 162 of the product serves as a function of the current value C of the control factor in the production system 150, the target value T of the control factor, the priority P % of the WIP, and a target date of the order. In the embodiment of the IC foundry, in which a plan is to be scheduled in a weekly-based plan period (7 days), the control factor matrix can be set as:

$$\text{Cycle time} = C - P\% * (C-T)/X \tag{1}$$

where:

C is the current cycle time (current value C of the control factor),

T is the target cycle time (target value T of the control factor),

P % is the priority of the WIP, and

X is the plan-based period number, in which:

$$X = INT((\text{target date} - \text{current date}) \div 7) + 1 \tag{2}$$

Figure 4:
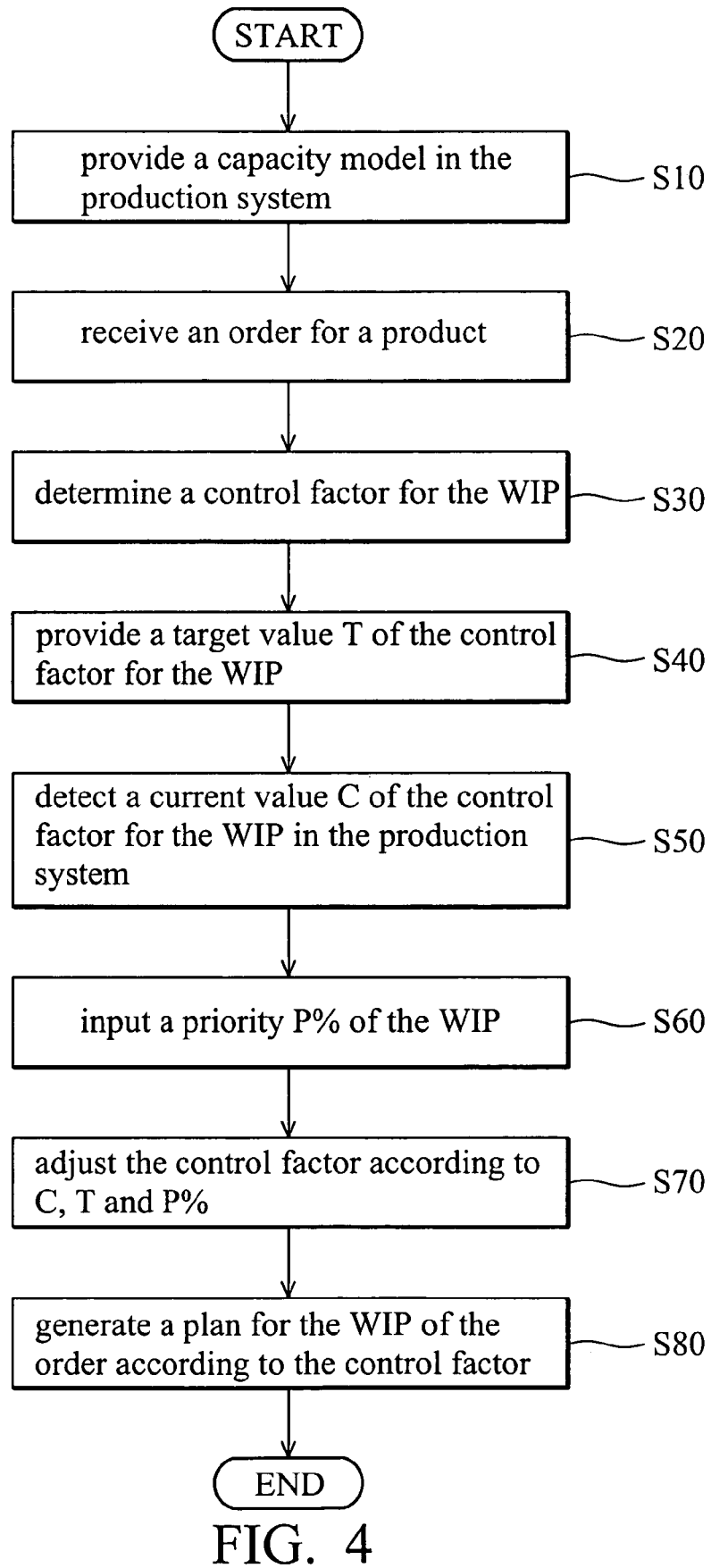
FIG. 4 is a flowchart showing the method of output planning with control factor management of the present invention.

According to the embodiment, a method of output planning with control factor management in the production system 150 can be described in reference to the flowchart of FIG. 4. A capacity model considering a plurality of capacity vectors in the production system 150 is provided (step S10). When the plan engine 130 receives an order for a product (step S20), a control factor, such as a cycle time, is determined and provided for the WIP of the product (step S30). A target value T of the control factor, i.e. the target cycle time, for the WIP of the product is provided (step S40), and a current value C of the control factor, i.e. the current cycle time, for the WIP in the production system 150 is detected (step S50) by the production monitor module 166. Further, a priority P % of the WIP, which is a percentage number between 0 and 100%, is input (step S60) to the control factor management module 160 via the user interface 140.

Then, the control factor (the cycle time) can be adjusted, e.g. with the control factor matrix 162 of the product, according to the current value C of the control factor, the target value T of the control factor, and the priority P % (step S70). Thus, the adjusted control factor is provided to the plan engine 130, and a plan for the WIP of the order is generated in the plan engine 130 based on the capacity model according to the control factor (step S80).

According to the flowchart of FIG. 4, one of the parameters considered in the adjustment of the control factor is the priority P %. For example, in a production system where a cycle time for the IC product is applied as the control factor of the production scheduling engine, a model of the WIP production, which is similar to FIG. 2, can be shown as a diagram in FIG. 5, in which two embodiments with different priorities are illustrated.

Figure 5:
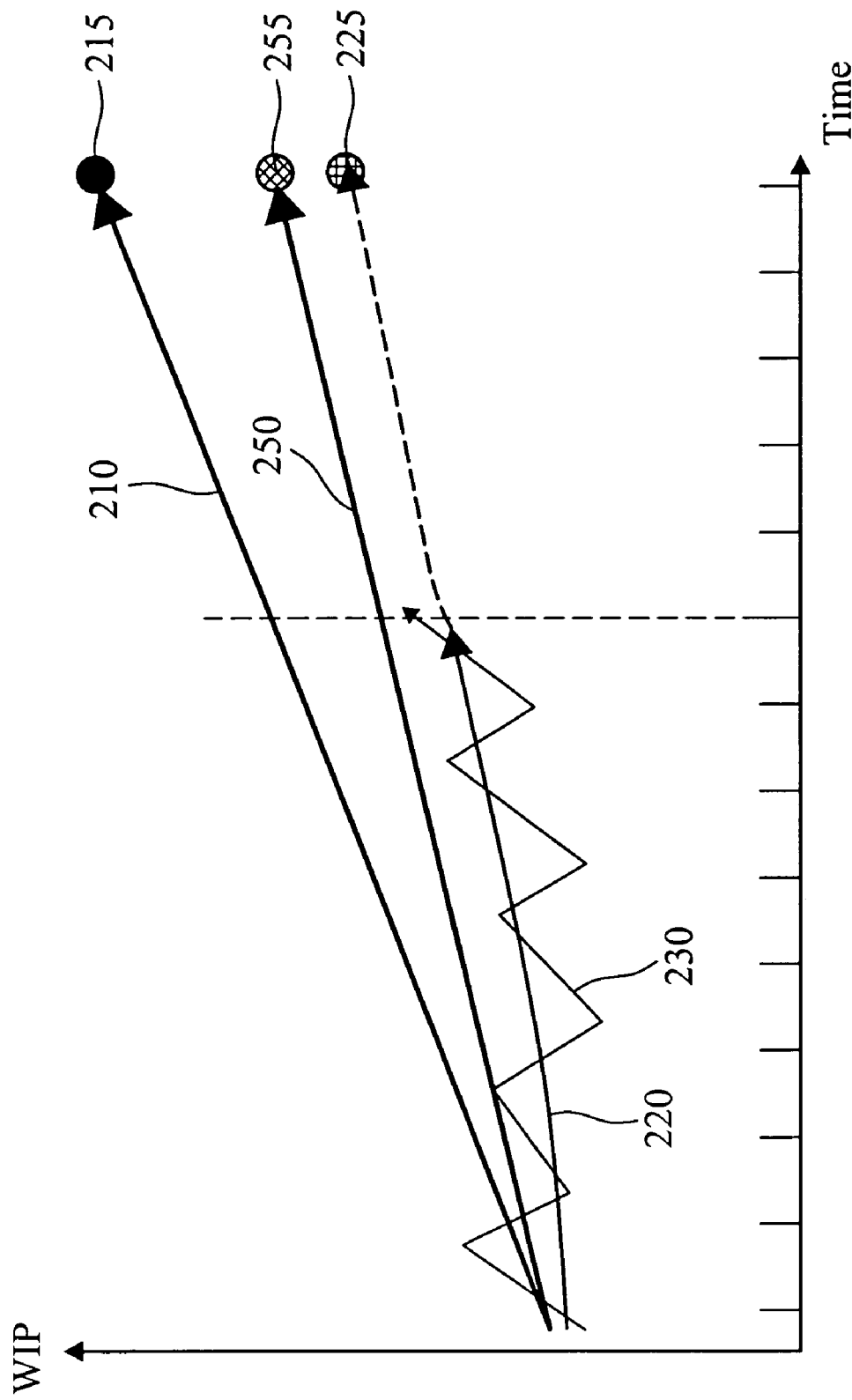
FIG. 5 is a diagram showing an embodiment of a model of the WIP with different priority, in which the control factor is the cycle time of the product.

In FIG. 5, a target 215 of the IC product is set, and a straight line 210 of production with a target cycle time T is obtained. Generally, the target cycle time T can be the fixed ideal cycle time (the ideal control factor) in FIG. 2. Further, the actual cycle time in the production system is illustrated by the polyline 230 of production. It is obvious that the current cycle time is longer than the ideal cycle time. Thus, the planner may consider requirements of the client and give a priority percentage P % to the WIP.

When the priority P % is set to be zero (0%), the cycle time according to Equation (1) is:

$$\text{Cycle time} = C - 0\% * (C-T) \div X = C \quad (3)$$

That is, the cycle time of the WIP with zero priority is set to be the current cycle time C. A line 220 of production with the zero priority is shown in FIG. 5, in which the target 225 of the zero priority is a target of the current cycle time C.

On the other hand, when the priority P % is set to be a non-zero value, the cycle time according to formula (1) is:

$$\text{Cycle time} = C - P\% * (C-T) \div X(0 < P\% <= 1) \quad (4)$$

That is, the cycle time of the WIP with non-zero priority is set to be a value between the current cycle time C and the target cycle time T (the ideal cycle time). A line 250 of production with the non-zero priority is shown in FIG. 5, in which the target 255 of the non-zero priority is in a position between the target 225 of the current cycle time C and the target 215 of the target cycle time T.

For example, an IC foundry may have a target cycle time of 2.4 days per stage, and the current cycle time is detected as 2.7 days per stage. Supposed the stage is weekly based, the current date is Jul. 10, 2003, and the target date of the WIP is Aug. 31, 2003, the plan-based period number X can be calculated according to Equation (2) as:

$$X = INT((\text{target date} - \text{current date}) \div 7) + 1 = 8.$$

The cycle time of zero priority according to Equation (3) is:

$$\text{Cycle time} = 2.7 \text{ days per stage}$$

The cycle time of full priority (that is, P %=100%), according to Equation (4), is:

$$\text{Cycle time} = 2.7 - 100\% * (2.7 - 2.4)/8$$
$$= 2.6625 \text{ days per stage}$$

Further, the cycle time of the 10% priority (P %=10%), according to Equation (4), is:

$$\text{Cycle time} = 2.7 - 10\% * (2.7 - 2.4)/8$$
$$= 2.69625 \text{ days per stage}$$

Thus, the cycle time can be obtained with respect to both the current cycle time and the target cycle time (the ideal cycle time).

Figure 6:
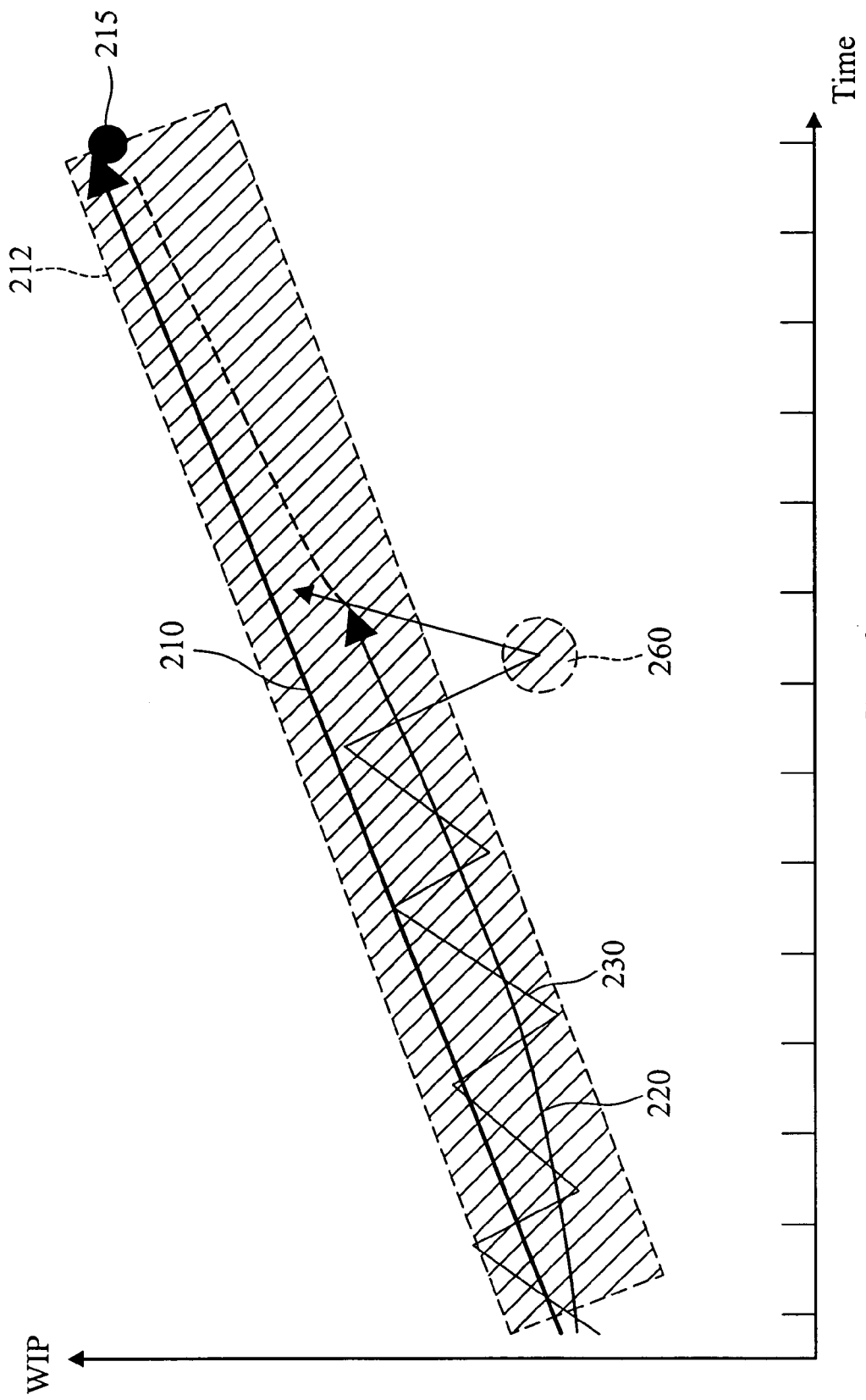
FIG. 6 is a diagram showing an embodiment of a model of the WIP, in which a deviation occurs in the current value of the control factor.

It should be mentioned that, in the model of the WIP of FIG. 5, a deviation might occur between the current value of the cycle time and the adjusted cycle time. FIG. 6 shows an example of the model in which the deviation 260 occurs. Accordingly, the control factor management module 160 can be set to output an alarm signal when the current cycle time (that is, the current value of the control factor) deviates from the adjusted cycle time (that is, the adjusted control factor) to inform the planner to check the control factor matrix 162 for the WIP of the product in the control factor management module 160.

With the above-mentioned system and method of control factor management of the present invention, a dynamic control factor can be obtained for a plan engine in use of output planning management in a production system. With the present invention, the planner can determine the control factor with respect to both the current actual control factor and the delivery date target of the product. Further, the planner can easily maintain the control factor matrix to keep the plan engine effective and accurate. Thus, both forecast quality of the plan engine and the production improvement can be achieved for a work-in-process in the production system.

It should be noted that the method of the present invention can be implemented in the form of a computer program. A storage medium can be applied to store the computer program which, when executed, causes the computer to perform the method of the present invention.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer implemented system for control factor management for a work-in-process (WIP) in a production system, comprising:
   a plan engine to generate a plan for an order for the WIP according to a control factor; and
   a control factor management module to adjust the control factor of the plan engine according to a current value of the control factor in the production system, a target value of the control factor, and a priority of the WIP, wherein the control factor management module comprises a control factor matrix for the WIP, the control factor matrix being a function of the current value of the control factor in the production system, the target value of the control factor, the priority of the WIP, and a target date of the order.

2. The computer implemented system for control factor management as claimed in claim 1, wherein the control factor management module comprises a database to store a plurality of historical control factors for the WIP.

3. The computer implemented system for control factor management as claimed in claim 2, wherein the control factor management module outputs an alarm signal when the current value of the control factor deviates from the adjusted control factor.

4. The computer implemented system for control factor management as claimed in claim 3, wherein the control factor management module comprises a production monitor module to detect the current value of the control factor in the production system.

5. The computer implemented system for control factor management as claimed in claim 1, wherein the WIP comprises wafers for processing and the production system is an IC foundry.

6. The computer implemented system for control factor management as claimed in claim 5, wherein the control factor comprises a cycle time for the WIP.

7. A computer implemented system for output planning with control factor management in a production system, comprising:
　　a capacity model, considering a plurality of capacity vectors in the production system;
　　a plan engine to receive an order for a product, reserve a capacity for the order based on the capacity model, and generate a plan for a work-in-process (WIP) of the order according to a control factor; and
　　a control factor management module to adjust the control factor of the plan engine according to a current value of the control factor in the production system, a target value of the control factor, and a priority of the WIP.

8. The computer implemented system for output planning with control factor management as claimed in claim 7, wherein the control factor management module comprises a control factor matrix for the product, the control factor matrix being a function of the current value of the control factor in the production system, the target value of the control factor, the priority of the WIP, and a target date of the order.

9. The computer implemented system for output planning with control factor management as claimed in claim 8, wherein the control factor management module comprises a database to store a plurality of historical control factors for the WIP.

10. The computer implemented system for output planning with control factor management as claimed in claim 9, wherein the control factor management module outputs an alarm signal when the current value of the control factor deviates from the adjusted control factor.

11. The computer implemented system for output planning with control factor management as claimed in claim 10, further comprising a production monitor module to detect the current value of the control factor in the production system.

12. The computer implemented system for output planning with control factor management as claimed in claim 7, wherein the WIP comprises wafers for processing and the production system is an IC foundry.

13. The computer implemented system for output planning with control factor management as claimed in claim 12, wherein the control factor comprises a cycle time for the WIP.

14. A computer implemented system for output planning with control factor management in an IC foundry, comprising:
　　a capacity model, considering a plurality of capacity vectors in the IC foundry;
　　a plan engine to receive an order for an IC product, reserve a capacity for the order based on the capacity model, and generate a plan for a work-in-process (WIP) of wafers for processing of the order according to a control factor; and
　　a control factor management module to adjust the control factor of the plan engine according to a current value of the control factor in the IC foundry, a target value of the control factor, and a priority of the WIP.

15. The computer implemented system for output planning with control factor management as claimed in claim 14, wherein the control factor comprises a cycle time for the WIP.

16. The computer implemented system for output planning with control factor management as claimed in claim 15, wherein the control factor management module comprises a control factor matrix for the WIP, the control factor matrix being a function of a current value of the cycle time in the IC foundry, a target value of the cycle time, the priority of the WIP, and a target date of the order.

17. The computer implemented system for output planning with control factor management as claimed in claim 16, wherein the control factor management module comprises a database to store historical cycle time for the WIP.

18. The computer implemented system for output planning with control factor management as claimed in claim 17, wherein the control factor management module comprises a production monitor module to detect the current value of the cycle time in the IC foundry.

19. The computer implemented system for output planning with control factor management as claimed in claim 15, wherein the control factor management module outputs an alarm signal when the current value of the control factor deviates from the adjusted control factor.

20. A method of control factor management for a work-in-process (WIP) in a production system, comprising the steps of:
　　determining a control factor for the WIP;
　　calculating a target value of the control factor for the WIP;
　　detecting a current value of the control factor for the WIP in the production system; and
　　adjusting the control factor according to the current value of the control factor, the target value of the control factor, and a priority of the WIP.

21. The method of control factor management as claimed in claim 20, wherein the control factor is a cycle time for the WIP.

22. The method of control factor management as claimed in claim 20, wherein the control factor is adjusted with a control factor matrix as a function of the current value of the control factor in the production system, the target value of the control factor, the priority of the WIP, and a target date of an order.

23. A method of output planning with control factor management in a production system, comprising the steps of:
　　providing a capacity model considering a plurality of capacity vectors in the production system;

receiving an order for a product;

determining a control factor for the product;

generating a plan for the order based on the capacity model according to the control factor;

providing a target value of the control factor for a work-in-process (WIP) of the product;

detecting a current value of the control factor for the WIP in the production system;

adjusting the control factor according to the current value of the control factor, the target value of the control factor, and a priority of the WIP; and adjusting the plan according to the control factor.

24. The method of output planning with control factor management as claimed in claim 23, wherein the control factor is a cycle time for the WIP.

25. The method of output planning with control factor management as claimed in claim 23, wherein the control factor is adjusted with a control factor matrix as a function of the current value of the control factor in the production system, the target value of the control factor, the priority of the WIP, and a target date of the order.

26. A method of output planning with control factor management in an IC foundry, comprising the steps of:

providing a capacity model considering a plurality of capacity vectors in the IC foundry;

receiving an order for an IC product;

providing a control factor for the IC product;

providing a target value of the control factor for a work-in-process (WIP) of the IC product;

detecting a current value of the control factor for the WIP in the IC foundry;

adjusting the control factor according to the current value of the control factor, the target value of the control factor, and a priority of the WIP; and generating a plan for the WIP of the order based on the capacity model according to the control factor.

27. The method of output planning with control factor management as claimed in claim 26, wherein the control factor is a cycle time for the WIP.

28. The method of output planning with control factor management as claimed in claim 26, wherein the control factor is adjusted with a control factor matrix as a function of the current value of the control factor in the IC foundry, the target value of the control factor, the priority of the WIP, and a target date of the order.

29. A storage medium storing a computer program which when executed causes a computer to perform a method of control factor management for a work-in-process (WIP) in a production system comprising the steps of:

determining a control factor for the WIP;

calculating a target value of the control factor for the WIP;

detecting a current value of the control factor for the WIP in the production system; and adjusting the control factor according to the current value of the control factor, the target value of the control factor, and a priority of the WIP.

30. The storage medium as claimed in claim 29, wherein the control factor is a cycle time for the WIP.

31. The storage medium as claimed in claim 29, wherein the control factor is adjusted with a control factor matrix as a function of the current value of the control factor in the production system, the target value of the control factor, the priority of the WIP, and a target date of an order.

32. A storage medium storing a computer program which when executed causes a computer to perform a method of output planning with control factor management in a production system comprising the steps of:

receiving an order for a product;

determining a control factor for the product;

reserving a capacity and generating a plan for the order according to the control factor;

calculating a target value of the control factor for a work-in-process (WIP) of the product;

detecting a current value of the control factor for the WIP in the production system;

adjusting the control factor according to the current value of the control factor, the target value of the control factor, and a priority of the WIP; and adjusting the plan according to the control factor.

33. The storage medium as claimed in claim 32, wherein the control factor is a cycle time for the WIP.

34. The storage medium as claimed in claim 32, wherein the control factor is adjusted with a control factor matrix as a function of the current value of the control factor in the production system, the target value of the control factor, the priority of the WIP, and a target date of the order.

35. A storage medium storing a computer program which when executed causes a computer to perform a method of output planning with control factor management in an IC foundry comprising the steps of:

receiving an order for an IC product;

determining a control factor for the IC product;

reserving a capacity and generating a plan for the order according to the control factor;

calculating a target value of the control factor for a work-in-process (WIP) of the IC product;

detecting a current value of the control factor for the WIP in the IC foundry;

adjusting the control factor according to the current value of the control factor, the target value of the control factor, and a priority of the WIP; and adjusting the plan according to the control factor.

36. The storage medium as claimed in claim 35, wherein the control factor is a cycle time for the WIP.

37. The storage medium as claimed in claim 35, wherein the control factor is adjusted with a control factor matrix as a function of the current value of the control factor in the IC foundry, the target value of the control factor, the priority of the WIP, and a target date of the order.

* * * * *